Jan. 10, 1928. 1,655,917
F. OBIOL
MOLD HEAD FOR THE FORMATION OF A FISSURE IN THE
MOUTH OF GLASS BOTTLES OR PORCELAIN, ETC
Filed Feb. 10, 1926
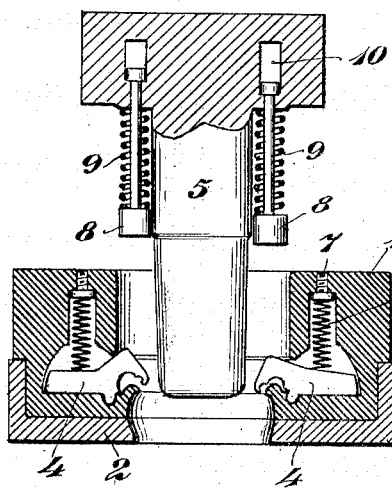
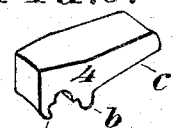
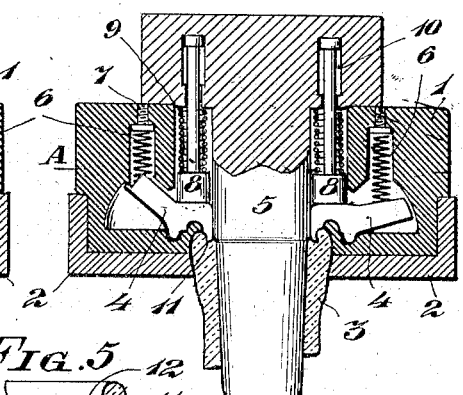
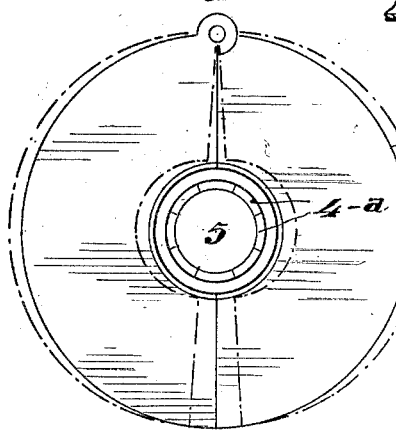
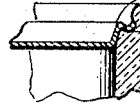
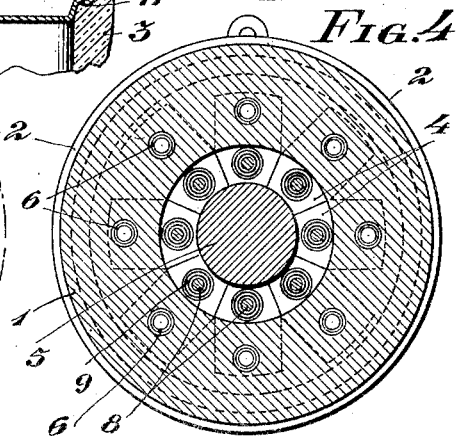
FELIPE Obiol
INVENTOR
By Otto Klunk
his ATTY.

Patented Jan. 10, 1928.

1,655,917

UNITED STATES PATENT OFFICE.

FELIPE OBIOL, OF BUENOS AIRES, ARGENTINA.

MOLD HEAD FOR THE FORMATION OF A FISSURE IN THE MOUTH OF GLASS BOTTLES OR PORCELAIN, ETC.

Application filed February 10, 1926. Serial No. 87,241.

This invention relates to improvements in machines for molding glass bottles and has reference more particularly to an automatically operated attachment for forming an internal circumferential groove in the neck of the bottle during the molding operation thereof.

The object of my invention is to provide an attachment for forming the internal groove in the neck of a bottle by means of a series of specially formed sectors operatively associated with a central plunger to fold into position to form the groove during the initial compression of the glass and to effectively release themselves from closed position to permit uninterrupted withdrawal of the bottle head.

My invention is illustratively exemplified in the accompanying drawing, in which, Figure 1 is a substantially vertical sectional view of the bottle neck molding device equipped with the internal groove form units shown in open position; Figure 2 is similar view of the parts in closed position and a bottle mold in place; Figure 3 is a bottom plan view of the mold head; Figure 4 is a transverse sectional view taken on lines A—A of Figure 2; Figure 5 is a sectional view of a bottle neck and cap; and Figure 6 is a perspective view of one of the sectors for forming the internal groove in the bottle neck.

Referring to the drawings, 1 denotes the ordinary annular mold head having its under face embraced by a pair of semicircular hinged caps 2, each thereof being provided with a center opening to permit the withdrawal of the bottle neck 3. A cavity is formed in the under portion of the head 1 to accommodate four radially disposed sectors 4, which are operated to closed position simultaneously with movement of an internal former 5, and which cooperate in closed position to form an internal circumferential groove 11 in the neck 3 of the bottle.

The sectors 4 comprise members having their ends, adjacent the center of the head 1, provided with hooked shaped noses $a$ and under projections $b$ which rest in depressions in the inner surface of the bottom wall of the head. Each sector rocks about the projection $b$ as a pivot while the whole sector is being yieldably urged to open position by a spring 6 which bears downwardly upon a tail piece C forming the outer end of the sector. In order that alternate sectors may first move into open closed position to be followed by the remaining sectors, the tail pieces C in the former are angularly disposed in an upward direction with respect to the main portions of the sectors, as illustratively exemplified in the accompanying Figure 2 of the drawing. This construction enables the sectors to operate freely with respect to each other. Tension of the springs 6 may be varied, as required, by adjustment of screws 7 against which the inner ends of the springs are disposed.

The internal former 5 comprises a slightly tapered spindle, which enters the bottle mold to form the throat, and which depends from a plunger head, the latter carrying a series of depending plungers 8, each alternate plunger being of greater length and provided with a head to engage an underlying sector 4 at a point inside the fulcrum point $b$. The head is arranged at the end of a spindle which is supported in a bore 10 in the plunger head, and which is embraced by a coiled spring 9 tending normally to project the spindle.

In operation the present invention performs substantially as follows: The cavity of the bottle mold is filled with glass immediately under the head 1, whereupon the plunger head descends and the spindle 5 enters the glass, causing the same to rise into the central opening in the cap 2 and under wall of the head 1. Simultaneous with the descent of the spindle 5, the spring supported plungers 8 enter the head 1 and bear downwardly upon the sectors 4 causing them to swing downwardly at their inner ends until the closed positions have been reached. During the descent of the spindle 5 and closing movement of the sectors the glass is being pressed and as a consequence it fills in the lip formed by the adjacent surfaces of sectors 5 and head 1, shown in Figure 2. When the spindle 5 and sectors have been withdrawn the space occupied by the hook shaped ends $a$ is an annular internal groove wherein a cap 12 can be hermetically sealed in the usual manner.

Having now described my invention what

I claim as new and desire to secure by Letters Patent is:

1. In a device of the character described, the combination of a head member and a divided cap embracing the under face thereof, a reciprocating plunger operating through said head to form the internal surface of a bottle neck, spring operated sectors fulcrumed in said head and arranged radially of the axis thereof, and yieldable plungers of alternately different lengths and carried by the reciprocating plunger to engage the sectors and press the latter into the lip of the bottle neck to form an internal circumferential groove therein.

2. A device for forming an annular groove in a bottle neck, as claimed in claim 1, in which the spring pressed end portions of sectors are arranged alternately at different angles to enable alternate sectors to release themselves from the bottle neck in advance of the adjacent sectors, substantially as described.

FELIPE OBIOL.